US006535857B1

(12) United States Patent
Clarke, III et al.

(10) Patent No.: US 6,535,857 B1
(45) Date of Patent: Mar. 18, 2003

(54) METHOD FOR DISTRIBUTING A PERIODICAL

(75) Inventors: James O. Clarke, III, Marietta, GA (US); Tom Crook, Murfreesboro, TN (US)

(73) Assignee: Magazines.com, Inc., Murfreesboro, TN (US)

( * ) Notice: Subject to any disclaimer, the term of this patent is extended or adjusted under 35 U.S.C. 154(b) by 0 days.

(21) Appl. No.: 09/436,860

(22) Filed: Nov. 9, 1999

(51) Int. Cl.$^7$ .............................................. G06F 17/60
(52) U.S. Cl. .............................. 705/28; 705/14; 705/16
(58) Field of Search .............................. 705/14, 26, 28, 705/29, 16

(56) References Cited

U.S. PATENT DOCUMENTS 5,056,029 A * 10/1991 Cannon ...................... 700/233
5,353,218 A * 10/1994 De Lapa et al. .............. 705/14
5,926,796 A    7/1999 Walker et al. ................. 705/16

FOREIGN PATENT DOCUMENTS

FR         2757656 A1 *  6/1998 ........... G06F/17/60

OTHER PUBLICATIONS

Scott, Ron, "Newsstand distribution: Analysing your options", Apr. 1989, Folio, vol. 18 No. 4, pp. 91–98.*
Manly, Lorne, "Publishers test four–day delivery", Sep., 1994, Folio, vol. 23 No. 14, pp. 35.*
Hochwald, Lambeth, "Rapid delivery gains momentum", Jan. 15, 1995, vol. 24 No. 1, pp. 31.*

* cited by examiner

Primary Examiner—Kenneth R. Rice
Assistant Examiner—James Kramer
(74) Attorney, Agent, or Firm—Thomas, Kayden, Horstemeyer & Risley (57) ABSTRACT

The present invention is directed to a method for distributing early issues of a periodical subscription to a consumer. Broadly, the method involves a redirection of periodicals from a retail point of sale to a consumer, during an interim period from a time when a subscription request is made and conventional delivery of the subscription begins. In accordance with one aspect of the invention a consumer places an order for a subscription to a periodical, which is to be delivered to the consumer. Then, a subscription agent or other entity determines when the subscription (by conventional delivery mechanisms) will start being delivered to the consumer (i.e., which issue will be the first issue received by the consumer). Then, interim issues are redirected from a retail point of sale to the consumer premises. In one distribution method, a wholesale distributor may redirect unsold periodicals from a retail point of sale to a consumer premises. More particularly, unsold issues of a periodical that are normally retrieved by a wholesale distributor and delivered to a shredder/recycler, may be mailed or otherwise distributed to a consumer until the consumer begins to receive the subscription through conventional distribution mechanisms.

25 Claims, 6 Drawing Sheets

METHOD FOR DISTRIBUTING A PERIODICAL

BACKGROUND OF THE INVENTION

1. Field of the Invention

The present invention generally relates to the distribution of periodicals, and more particularly to a method for distributing a periodical in such a way that new subscription orders are filled quickly.

2. Discussion of the Related Art

It has been reported that each year over one billion single-issue copies of magazines are sold through over 165,000 retail points of sale in the United States. As is known, the cost of a single issue, or the "cover price," is often as much as four times higher than the pro rata price of a single issue through a subscription. Despite the higher prices, consumers are often willing to purchase single issues from retail outlets because of convenience and timeliness.

However, some consumers decide to forgo the advantages of newsstand copies and purchase longer-term subscriptions to periodicals. There are a wide variety of well-known methods for subscribing to a periodical. For example, if a consumer wishes to subscribe to a magazine, the consumer may purchase a single issue at a retail outlet and mail back a "blow-in" or "bind-in" card enclosed in the magazine issue. Publishers place blow-in subscription cards by loosely inserting the cards into periodicals, such as magazines, using a method of air injection. Publishers insert bind-in cards into the periodicals by, for example, binding subscription cards into issues during the printing process. Publishers, acknowledge that these subscription cards are the most profitable means for the publisher to gain circulation. Nevertheless, various shortcomings arise from the traditional methodologies, which do not promote, and in fact hinder, consumers of single issues from subscribing to the periodicals.

One such shortcoming involves lost revenues to the retailer. Retailers carry single-issue periodicals predominantly for impulse purchases. However, if a consumer purchases a single-issue periodical at a retail outlet and then subscribes to the periodical by a blow-in or bind-in card, the retailer earns no additional revenue from the subscription. In addition, subscription cards contained in retail copies encourage consumers to buy a subscription that deprives the retailer of potential revenue from future single-issue sales to that consumer. Thus, retailers have no incentive to encourage purchasers of single issues to purchase subscriptions.

Several other shortcomings affect the consumer. For example, the initiation of a subscription by a blow-in or bind-in subscription card requires much time and patience on the part of the consumer. Such a subscription frequently takes weeks for processing. Indeed, federal rules require, when appropriate, that magazine publishers denote a waiting time disclaimer: "Allow 4–8 weeks for your first issue to be mailed." In addition, due to processing and delivery delays, the consumer may not actually receive the first issue of the magazine for ten to twelve weeks from the date of subscription. The uncertainty of when the first issue of the subscription will arrive often results in missed issues. In addition, purchasing subscriptions using subscription cards creates a risk of loss to the consumer because the consumer must deposit the subscription card in the mail, after which the consumer often has no record or invoice of the transaction.

Still other shortcomings for the consumer arise from the method of payment. Payment under the traditional subscription method constitutes an inconvenience for the consumer because the only way to enclose payment with a blow-in or bind-in subscription card requires that the consumer enclose the card and payment in an envelope with accompanying postage. Even if a toll-free number is provided for initiating the subscription, the call itself inconveniences the consumer. Furthermore, if payment is not made at the time of ordering, a two-step process is required: first, the submission of the blow-in or bind-in card, and second, the payment of a bill. This two-step ordering process is not only inefficient but also wastes the consumer' valuable time. Furthermore, when paying the bill, the consumer must again correspond with the magazine publisher, paying an invoice by check and returning the payment by mail. Due to processing and delivery delays, the consumer may even receive multiple invoices of the bill, even though payment has already been made. These incidents of inefficiency not only inconvenience the consumer and increase the costs and efforts of the magazine publisher, but also may jeopardize the goodwill of the magazine in the consumer'mind.

Another shortcoming for the consumer, regarding the method of payment, relates to the inability to pay with cash. There is presently no ready means for a consumer to subscribe to a periodical and pay with cash, except for the enclosure of cash in the mail, which is discouraged. The transmittal of cash in the mail, however, presents a threat of loss. Indeed, even the United States Postal Service warns consumers against sending cash through the mail. This inconvenience is particularly meaningful because some consumers may not wish to pay for a subscription to a controversial magazine by check or credit card, as these forms of payment serve as records of the transaction.

Still another shortcoming for the consumer in dealing with the method of payment involves the cost of the initial single-issue periodical. If a consumer subscribes to a periodical by responding to a blow-in or bind-in subscription card, the consumer loses the benefit of paying the lower subscription price for the first issue. Normally, the consumer initially purchases the single-issue periodical at full price, after which he pays the discounted price for the subscription. Thus, even when the consumer chooses to subscribe to a periodical following a single-issue purchase, the consumer always loses the initial investment of the purchase price of the single issue.

Yet other shortcomings affect the periodical publishers. Under the traditional subscription methodologies, publishers suffer reduced subscription revenues from consumers who might have purchased a subscription at the time they purchased the single-issue periodical at a retail outlet. Because the sale of periodicals at retail outlets depends primarily upon impulse sales, the inability to initiate an instantaneous subscription is believed to reduce subscription volume for periodical publishers. Also, outside the retail environment, a consumer may subscribe to a periodical in response to direct correspondence or indirect solicitations through the mail, telephonically, or through electronic means, such as e-mail. Nevertheless, under these circumstances, due to processing and mailing delays, the consumer still has no access to the current issue of the periodical, and the publisher loses these single-issue sales.

There have been various attempts to overcome these and other shortcomings. Indeed, U.S. Pat. No. 5,926,796 (hereinafter the '796 patent) alleges that various "attempts" have been made to solve the problems associated with initial periodical subscriptions. One attempt described in the '796 patent involved the sale of gift subscriptions at retail outlets. The consumer could purchase a box containing a gift card to be sent to the recipient, a magazine activation card to be sent to a processing center, and the envelopes for both sets of cards. The consumer would send the gift card to the recipient and the activation card to a processing center. The retailer would retain a percentage from the purchase price and remit the balance of the payment to the processing center. Upon receipt of the activation card from the consumer and the payment from the retailer, the processing center would take a percentage from the payment and forward the card and the balance of the payment to the magazine publisher.

This attempt allegedly fails to even address, much less overcome, the inconveniences associated with the traditional subscription methodologies. For example, this attempt provided no solution for the lengthy processing time required by the traditional methodologies. Also, this attempt provided no mechanism by which the subscriber could receive the current issue of the periodical as the first issue of the subscription. Furthermore, even if the consumer purchased the current issue concurrently with this attempt, the consumer would still not obtain the benefit of that issue in the subscription price.

Another attempt to overcome the inconveniences of the traditional subscription methodologies, as described in the '796 patent, included the retail sale of subscriptions at bookstores. The subscriptions were offered as part of a shelf-displayed package placed on a hook. The consumer could purchase one of the packages and subscribe to a periodical by paying for the package at the retail point-of-sale and then sending the pre-paid subscription activation card to the fulfillment house. Still another attempt incorporated the sale of subscriptions at specialty subscription kiosks. These kiosks comprised a computer system utilizing touch screen technology to enable consumers to select and purchase either a subscription or a gift subscription. The consumer could pay for either type of subscription at the kiosk by credit card, and the kiosk would issue a receipt for the transaction. For gift subscriptions, the subscription kiosk would also dispense a gift card. For both types of subscriptions, the kiosks informed consumers of a four-to-eight week delay before the arrival of the first issue.

Allegedly, none of these attempts solved the inconveniences of the traditional subscription methodologies. These attempts incorporated significant delay due to processing requirements. Indeed, the subscription kiosk attempt specified a four-to-eight week delay. In addition, none of these attempts allowed the consumer to receive the current issue of the periodical with the subscription. Also, the attempts made no provision for a consumer to benefit from a subscription in the price of the current issue.

The invention of the '796 patent disclosed an apparatus and method for selling subscriptions to periodicals in a retail environment. The '796 patent disclosed an apparatus that comprises a point-of-sale (POS) terminal, a POS controller, a retail subscription system. The POS terminal allows a cashier to enter subscription sales data into the POS controller. The POS controller maintains databases on available subscriptions and produces databases containing data relating to subscriptions sold to consumers. The retail subscription system verifies the subscriptions by reference to its own databases and transmits the subscriptions to a fulfillment house for distribution.

The '796 patent also disclosed a method for establishing a subscription to a periodical at a point-of-sale terminal, comprising the steps of receiving at a point-of-sale terminal a single issue of a periodical, receiving at the point-of-sale terminal a subscription card requesting a subscription to the periodical (the subscription card containing a first set of subscription information), inputting into the point-of-sale terminal a second set of subscription information (the second set including subscription price and term), receiving payment for the subscription, generating a receipt containing the subscription price and term, and providing the single issue as the first issue of the subscription.

Notwithstanding the alleged improvements of the '796 patent, other shortcomings remain. Perhaps the most significant shortcoming is the continued risk that consumers will miss one or more issues of a periodical before delivery of the periodical to the consumer'premises begins. In the case of a weekly periodical, such as Time or Newsweek magazines, an 8 to 12 week delay in the initiation of the subscription may result in 7 to 11 issues of the subscription being missed by the consumer (all except the first issue which was purchased at the retail POS).

In addition, the system and method of the '796 patent fails to address shortcomings of other subscription distribution methods. For example, subscriptions made through subscription agents by mail, phone, e-mail, web site, etc. still suffer the now customary delay in the initial fulfillment of new subscriptions. In addition, the collection and recycling process of otherwise unsold retail copies of periodicals implicates additional costs and expenses.

Accordingly, it is desired to provide a method for distributing periodicals in such a manner that new subscriptions can be more quickly filled.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the objects and advantages of the present invention, the present invention is directed to a method for distributing early issues of a periodical subscription to a consumer. Broadly, the method involves a redirection of periodicals from a retail point of sale to a consumer, during an interim period from a time when a subscription request is made and conventional delivery of the subscription begins. In accordance with one aspect of the invention a consumer places an order for a subscription to a periodical, which is to be delivered to the consumer. Then, a subscription agent or other entity determines when the subscription (by conventional delivery mechanisms) will start being delivered to the consumer (i.e., which issue will be the first issue received by the consumer). Then, interim issues are redirected from a retail point of sale to the consumer premises.

In one distribution method, a wholesale distributor may redirect unsold periodicals from a retail point of sale to a consumer premises. More particularly, unsold issues of a periodical that are normally retrieved by a wholesale distributor and delivered to a shredder/recycler, may be mailed or otherwise distributed to a consumer until the consumer begins to receive the subscription through conventional distribution mechanisms.

In accordance with one aspect of the present invention, periodical subscriptions may be initiated from a retail point of sale. This step in the process may be done in any of a variety of ways. In one scenario, the consumer may provide the subscription information ordinarily provided to a subscription agent directly to a cashier at the retail point of sale. This information may then be relayed from the retailer to the subscription agent, which may interface with a wholesale distributor to obtain interim issues of the periodical(s) to supply the consumer. The consumer may initiate a subscription at the same time that the consumer purchases and receives a first issue or copy of the periodical.

Another way in which this aspect of the invention may be implemented is through the distribution of kiosks or point of sale terminals at a retailer. Using a kiosk, or point of sale terminal, a consumer may scan the bar code of a given publication (using a bar code scanner on the kiosk). The kiosk may then print a subscription information card, which the subscriber may then take to the cashier for payment. In one implementation, the payment could be made for the entire subscription. In another implementation, the payment made to the cashier may be for the single issue obtained by the consumer (at the reduced, subscription price). That payment may be relayed from the retailer to the subscription agent, and the payment may be credited towards the subscription price. The subscription agent may later bill the consumer for the remaining balance of the subscription.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Figure 1:
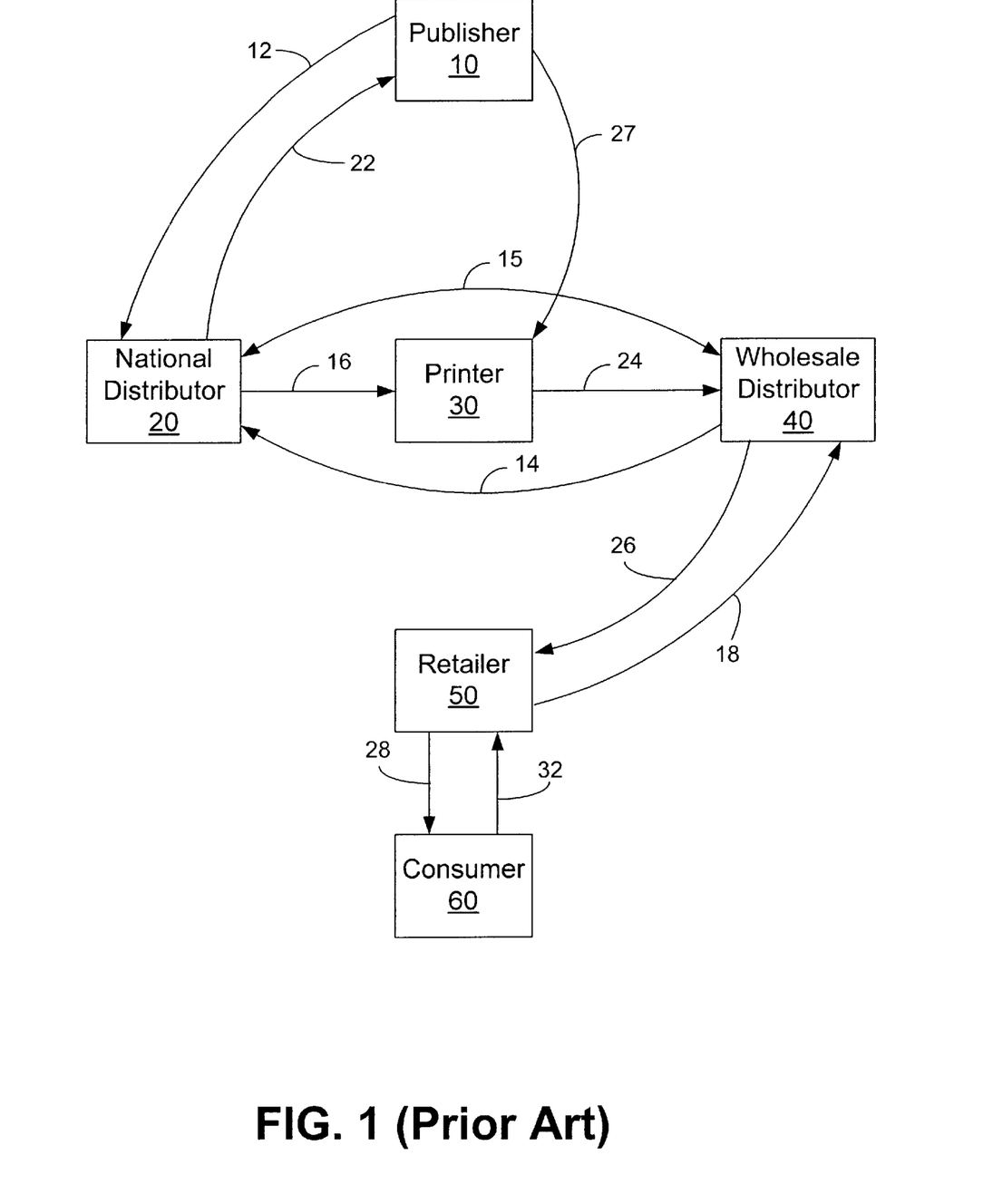
FIG. 1 is a block diagram illustrating the inter-relationship of entities involved in the conventional distribution of periodicals through retail points of sale.
Figure 2:
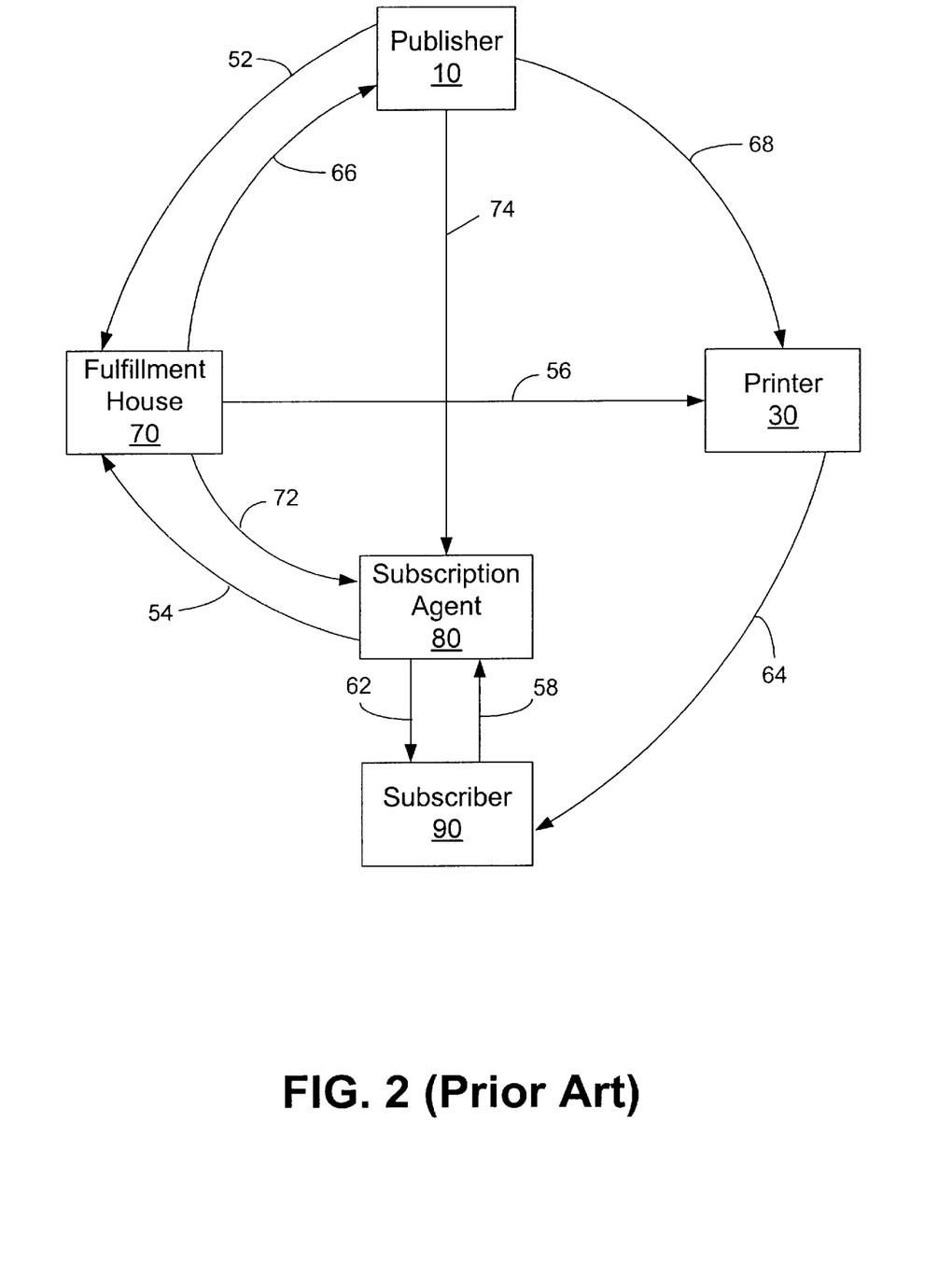
FIG. 2 is a block diagram illustrating the inter-relationship of entities involved in the conventional distribution of periodicals through subscription purchases.

Before describing various embodiments of the present invention, reference is first made to FIGS. 1 and 2, which provide additional information pertaining to the conventional distribution of periodicals, both in a retail setting as well as a subscription distribution environment. It should be appreciated, however, that the block diagrams presented in FIGS. 1 and 2 generalize conventional periodical distribution environments, and variations of these generalizations certainly may exist for any given distribution chain.

Referring first to FIG. 1, a block diagram is presented showing a conventional retail periodical distribution environment and procedure. As illustrated, the principal entities involved in the retail distribution of periodicals include a publisher 10, a national distributor 20, a printer 30, a wholesale distributor 40, a retailer 50, and finally a consumer 60. As is known, publishers include entities such as Time, Hearst, Conde Nast, etc, who are responsible for planning, compiling, editing, etc. a given periodical. National distributors include entities such as Time Distribution Services, Warner Publisher Services, Curtis Circulation Company, etc., who typically contract with a publisher to handle certain aspects of a periodical'distribution, namely billing/collection and marketing/sales support. Printers 30 include entities such as Quad Graphics, World Color Press, etc. The national distributor 20 typically communicates delivery requirements and delivery addresses to the printer 30. In addition, the printer 30 typically has a relationship with the publisher 10, whereby the publisher 10 pays the printing costs associated with the printing of a given periodical. Wholesale distributors 40 include entities such as Anderson, Cohen, Levy, etc. Wholesale distributors 40 and national distributors 20 typically work together so that the national distributor can allocate a sufficient number of copies to the wholesale distributor for distribution to the consumer base of the wholesale distributor. Retailers 50 include entities such as Wal-Mart, Albertson's, KMart, independent newsstands, etc. Typically, wholesale distributors 40 contract with retailers 50 for the allotment and sale of periodicals and other publications. Finally, consumers 60 typically purchase single-copy issues of periodicals from retailers 50. As is known, the single-copy issues purchased at retail points of sale are priced at typically three to four times the amount paid for subscription periodicals.

However, some consumers decide to forgo the advantages of newsstand copies and purchase longer-term subscriptions to periodicals. There are a wide variety of well-known methods for subscribing to a periodical. For example, if a consumer wishes to subscribe to a magazine, the consumer may purchase a single issue at a retail outlet and mail back a "blow-in" or "bind-in" card enclosed in the magazine issue. Publishers place blow-in subscription cards by loosely inserting the cards into periodicals, such as magazines, using a method of air injection. Publishers insert bind-in cards into the periodicals by, for example, binding subscription cards into issues during the printing process. Publishers acknowledge that these subscription cards are the most profitable means for the publisher to gain circulation. Nevertheless, various shortcomings arise from the traditional methodologies, which do not promote, and in fact hinder, consumers of single issues from subscribing to the periodicals.

Having briefly described the various entities and their respective roles in the retail distribution of periodicals, additional detail will now be provided as to the chain of events involved in the printing, publication, and distribution of a periodical through a retail point of sale. Beginning with the relationship of the publisher 10 and national distributor 20, a publisher typically authorizes and contracts 12 with a national distributor 20 to handle certain aspects of a publication's distribution. Pursuant to this authorization, a national distributor typically engages in contracts with a printer 30 and wholesale distributor 40 to handle certain aspects of the distribution of a periodical. Specifically, a wholesale distributor 40 and national distributor 20 work together 15 so that a national distributor can allocate a sufficient number of copies to the wholesale distributor 40. Based upon information 14 provided by the wholesale distributor 40 to the national distributor 20, the national distributor 20 can make the determination as to how many periodicals to allocate to the wholesale distributor 40, and this information 16 is communicated to the printer 30. In addition, the wholesale distributor 40 may provide information 14 to the national distributor 20 as to the number of copies of periodicals distributed to various retailers 50, which were not sold.

Specifically, when a periodical issue has reached the end of its distribution or retail period, unsold copies remaining at their retailer 50 are returned 18 to a wholesale distributor 40. The wholesale distributor 40 typically takes these unsold magazines to a shredder/recycler for recycling. Typically, bar codes provided on the periodicals are scanned during this process so that an accurate count and accounting may be made of the shredded/recycled, unsold periodicals. This information is communicated 14 to the national distributor 20. In turn, the national distributor 20 provides both payment and information 22 to the publisher 10. This payment and information 22 includes an accounting of the number of issues sold, the number of issues shredded and an appropriate payment.

Based upon the information 16 provided by the national distributor 20 to the printer 30, the printer 30 provides magazines 24 to the wholesale distributor 40 for distribution 26 to retailers 50. Typically, the wholesale distributor 40 breaks down the shipment in magazines 24 that it receives from the printer 30 and places the various copies on smaller trucks or vans, which then take the various copies to a plurality of retailers 50. Ultimately, the retailer sells magazines 28 to consumers in exchange for payment 32. Typically, at the same time a wholesale distributor 40 distributes magazines 26 to a retailer 50, the wholesale distributor 40 will collect from the retailer 50 any unsold magazines 18 from the prior publication period, and these magazines are directed to the shredder/recycler, as discussed above.

In addition, the publisher 10 makes payments 27 to the printer 30.

As mentioned previously, it should be understood that the retail periodical distribution chain described in FIG. 1 has been generalized, and that variants of the scheme discussed herein may exist.

Reference is now made to FIG. 2, which is a block diagram that illustrates a similar periodical distribution chain. However, the distribution chain illustrated in FIG. 2 reflects the environment for distributing periodicals through subscription, as opposed to retail, purchases. As in FIG. 1, the subscription distribution network includes a publisher 10 and a printer 30. In addition, it includes one or more fulfillment houses 70, subscription agents 80, and subscribers 90. Having been described in FIG. 1, the publishers 10 and printers 30 need not be described again. As is known, fulfillment houses 70 includes entities such as Centrobe, Kable, etc. Much like the role of a national distributor 20 in the context of the retail distribution of periodicals, a fulfillment house 70 typically contracts with a publisher 10 to manage certain aspects of the subscription distribution of periodicals. Specifically, a fulfillment house 70 is authorized 52 by a publisher 10 to interface with a subscription agent 80 to collect remittances 54 from a subscription agent 80, as well as to provide 56 information and instructions to the printer 30 regarding the identification and mailing of subscription publications to subscribers 90.

Subscription agents 80 include entities such as Magazine Processing Center, Publishers Clearinghouse, as well as others. A subscription agent 80 interfaces with a subscriber 90 to obtain both payment and information 58 in exchange for a periodical subscription 62 (for a certain price) to cover a prescribed number of issues of a periodical. In manners that are well known, subscription agents 80 may interface with a subscriber 90 by receiving mailed in bind-in or blow-in cards, which the subscriber 90 may have retrieved from a prior issue of a periodical and filled out. Subscription agents 80 may also interface with subscribers over the telephone, through field agents, computer, or in other ways. The information obtained from the subscriber will include an identification of the subscriber (e.g., name, address, telephone number, etc.), and identification of the periodical that the subscriber 90 desires, the subscription term selected by the subscriber, and payment for this subscription (check, money order, cash, credit card authorization, etc.) This information is communicated 54 from the subscription agent 80 to the fulfillment house 70. This information is relayed from the fulfillment house 70 to both the printer 30 as well as the publisher 10. Based upon the information 56 relayed to the printer, the printer 30 distributes (e.g., via mail) magazines 64 to the subscriber 90. Based upon the information 66 provided from the fulfillment house 70 to the publisher 10, the publisher 10 remits payment 68 to the printer 30.

As also illustrated, fulfillment house 70 provides information 72 to subscription agents 80, and publishers 10 provide authorization 74 to subscription agents 80.

Figure 3:
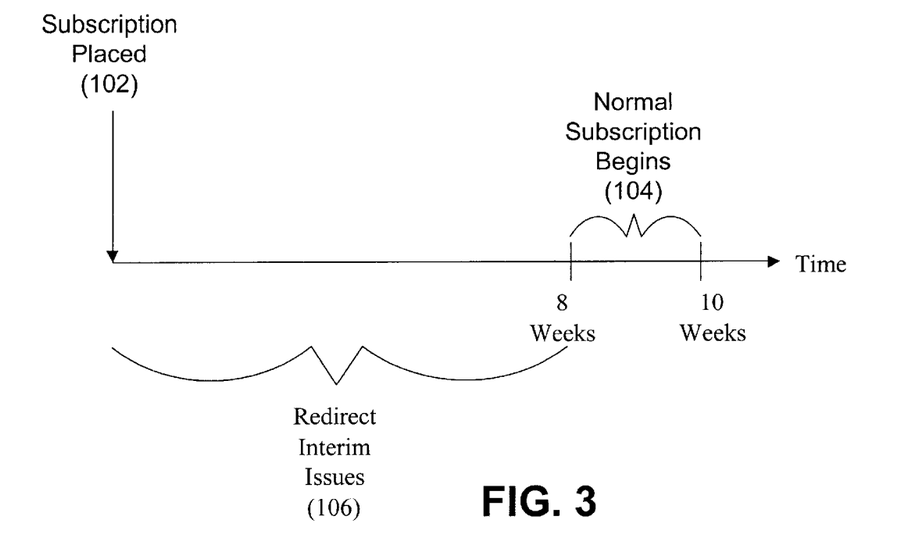
FIG. 3 is a graph illustrating a time line of events during which interim periodicals may be distributed in accordance with the invention.

As is known, due to a number of factors including the manner in which the various entities in the subscription distribution environment interact, the manner in which subscriptions are processed, and other factors, the fulfillment of a subscription typically requires 8 to 12 weeks of processing or other delay before a subscriber 90 begins to receive early issues of a subscription. As is illustrated in FIG. 3, a subscription may be placed 102 by depositing a blow-in or bind-in card in the mail, or otherwise providing subscription information to a subscription agent (e.g., by telephone, computer, or other manner). Thereafter, the subscriber typically waits 8 to 12 weeks before the normal subscription delivery 104 begins. In the interim, one or more issues of the periodical are often missed by the subscriber, depending upon whether the periodical is distributed quarterly, monthly, weekly, or even daily. As a result, a subscriber is typically forced to either miss issues of the periodical or pay retail price to purchase interim issues at a retail point of sale.

The present invention, however, addresses this significant shortcoming of the prior art subscription distribution chain by redirecting interim issues 106 of a periodical so that a subscriber'subscription is fulfilled immediately. Broadly, the present invention achieves this goal through a novel method of interfacing entities between the retail periodical distribution environment and the subscription periodical distribution environment. Heretofore, the entities presented in FIGS. 1 and 2 operated to distribute periodicals in an independent and substantially mutually exclusive fashion. However, the method of the invention implements a novel approach for interfacing subscription agents, wholesale distributors, and consumers in order to more effectively initiate the fulfillment of subscription orders. Broadly, the present invention redirects unsold periodical issues from a retail point of sale to the subscriber or consumer. One way this redirection may be achieved is to have a wholesale distributor, upon collecting unsold issues, direct those issues to new subscribers, either directly or through a subscription agent. Another manner of achieving this redirection is by mailing, from the subscription agent, the subscriber coupons, which may be presented at a retailer as payment for periodicals. This would allow the subscriber to obtain periodicals from a retail point of sale without further payment, thereby avoiding retail costs for interim issues of a periodical. The retailer, in turn, could redeem the coupon through a subscription agent, wholesale distributor, or other entity in the distribution chain. It should be appreciated that, ultimately, this information is communicated to the various appropriate entities in the distribution chain and payment may be allocated accordingly.

Figure 4:
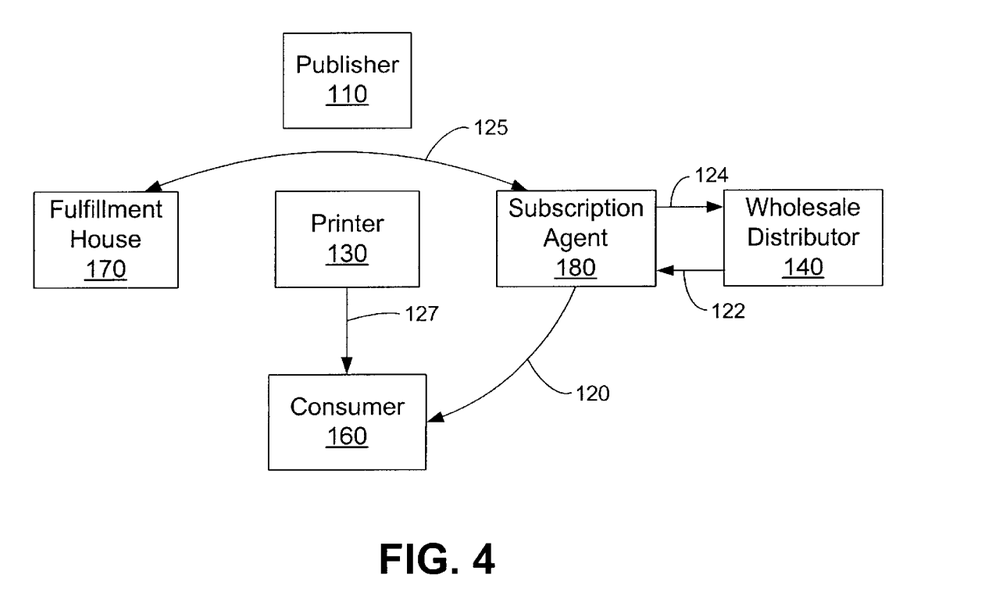
FIG. 4 is a block diagram illustrating the inter-relationship of entities involved in the distribution of subscription periodicals in accordance with one aspect of the present invention.

Reference is now made to FIG. 4, which is a block diagram illustrating one embodiment of the distribution method of the present invention. Specifically, the embodiment illustrated in FIG. 4 contemplates the initiation of a periodical subscription through the interaction between a consumer 160 and subscription agent 180. The other entities illustrated in the drawing include the publisher 110, fulfillment house 170, printer 130, and wholesale distributor 140. The roles, obligations, and interactions of the various entities illustrated in FIG. 4 include the conventional roles, obligations, and interactions discussed in connection with FIGS. 1 and 2. For clarity of this disclosure, these relationships will not be repeated herein. Instead, only additional or different interactions resulting from the implementation of the method of the present invention will be discussed.

Thus, it should be understood from the discussion provided in connection with FIG. 2 that a subscription agent 180 receives payment (or payment authorization), as well as other information from a consumer or subscriber 160 regarding the initiation of a periodical subscription. This information 125 may be communicated from the subscription agent 180 to a fulfillment house 170. In return, the subscription agent may obtain from the fulfillment house 170 information as 125 to when the normal subscription delivery period to the consumer 160 will begin. Based upon this information, the subscription agent may make conditional arrangements to ensure that interim issues of the periodical are not missed by the consumer 160. One way that these additional arrangements may be implemented is through a novel affiliation between the subscription agent and wholesale distributor 140. In accordance with this novel affiliation, the subscription agent may provide to the wholesale distributor 140 information 122 including an identification of one or more periodicals desired, a quantity of the one or more periodicals desired, and possibly a payment to the wholesale distributor 140 in exchange for the identified periodicals 124. Preferably, the periodicals 124 routed from the wholesale distributor to the subscription agent will be unsold periodicals that have been collected by the wholesale distributor 140 from retail points of sale, which unsold periodicals would otherwise be directed to a shredder/recycler. The subscription agent may instead relay these periodicals 126 to the consumer 160. Once the printer 130 is ready to begin mailing normal subscription issues 127 to the subscriber 160, fulfillment responsibility will transition from the subscription agent 180 to the printer 130.

It should be appreciated that the novel distribution method of the present invention results in a win-win scenario for the various entities involved. First, and perhaps most significantly, consumer satisfaction is increased, as the consumer 160 begins to receive a subscribed periodical almost instantly from the point of subscription. Importantly, no interim issues of the periodicals are missed in this process. The unsold periodicals that are typically sent from a wholesale distributor 140 to a shredder/recycler may be redirected into subscription publication, so that more proceeds may be obtained from the periodicals. Further still, due to increased consumer satisfaction, more subscriptions are likely to be placed than are currently placed under the conventional subscription process.

Figure 5:
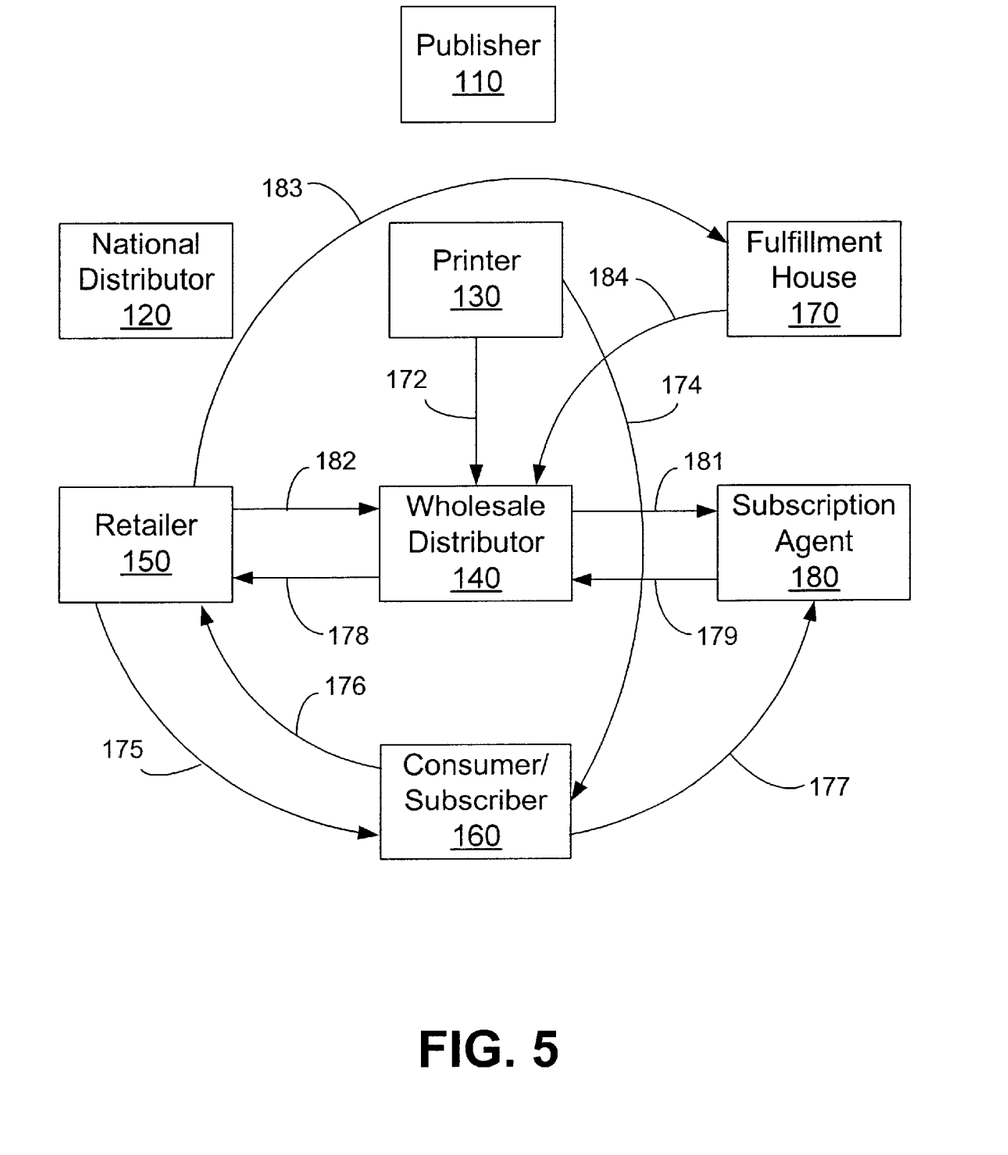
FIG. 5 is a block diagram illustrating the inter-relationship of entities involved in the distribution of subscription periodicals, initiated at a retail point of sale, in accordance with one aspect of the present invention.

Reference is now made to FIG. 5, which is a block diagram illustrating yet another embodiment of the present invention, wherein subscriptions may be initiated by a consumer 160 at a retail point of sale 150. Again, certain entities including a publisher 110, a national distributor 120, a printer 130, a wholesale distributor 140, a fulfillment house 170 and subscription house 180, are illustrated. Generally, the roles and responsibilities of these various entities are the same as discussed above. However, additional roles and responsibilities are illustrated herein in order to effectuate the novel distribution method of the present invention. In accordance with this embodiment of the present invention, a consumer 160 may place a subscription order at a retail point of sale 150. This step in the process may be done in any of a variety of ways. In one scenario, the consumer 160 may provide the subscription information ordinarily provided to a subscription agent directly to a cashier at the retail point of sale 150. This information may the be relayed from the retailer 150 to the subscription agent 180, which may interface with a wholesale distributor 140 to obtain interim issues of the periodical(s) to supply the consumer 160 as described in connection with FIG. 4. With regard to the method of FIG. 5, the consumer may initiate a subscription at the same time that the consumer purchases and receives a first issue or copy of the periodical.

Another way in which the embodiment of FIG. 5 may be implemented is through the distribution of kiosks or point of sale terminals at a retailer 150. Using a kiosk, or point of sale terminal, a consumer 160 may scan the bar code of a given publication (using a bar code scanner on the kiosk). The kiosk may then print a subscription information card, which the subscriber may then take to the cashier for payment. In one implementation, the payment could be made for the entire subscription. In another implementation, the payment made to the cashier may be for the single issue obtained by the consumer 160 (at the reduced, subscription price). That payment may be relayed from the retailer 150 to the subscription agent 180, and the payment may be credited towards the subscription price. The subscription agent 180 may then bill the consumer 160 for the remaining balance of the subscription.

In an alternative implementation, the consumer 160 may provide subscription information to the retailer 150 (either directly or using a kiosk, as described above). Thereafter, the retailer 150 may communicate this information 183 to a fulfillment house 170, which then interfaces 184 with a wholesale distributor 140 to ensure the fulfillment of interim issues to the consumer.

As also illustrated, the printer 130 provides magazines 172 and 174 to both wholesale distributors 140 and consumers/subscribers 160. Retailers provide magazines and subscription cards 175 to consumer/subscribers 160. In response, consumers/subscribers provide payment to 176 to retailers 150 and subscription cards 177 to subscription agents 180. Retailers provide payment 178 to wholesale distributors 140, who in turn provide payment 179 to subscription agents. Further, information 181 and 182 from the subscription cards 177 provided from the consumer/subscribers 160 is passed from the subscription agents 180 to the wholesale distributors 140 and from the wholesale distributors 140 to retailers 150.

It should be appreciated that there are various ways in which the payments for the periodicals may be allocated among the various entities in FIGS. 4 and 5, consistent with the scope and spirit of the present invention.

Figure 6:
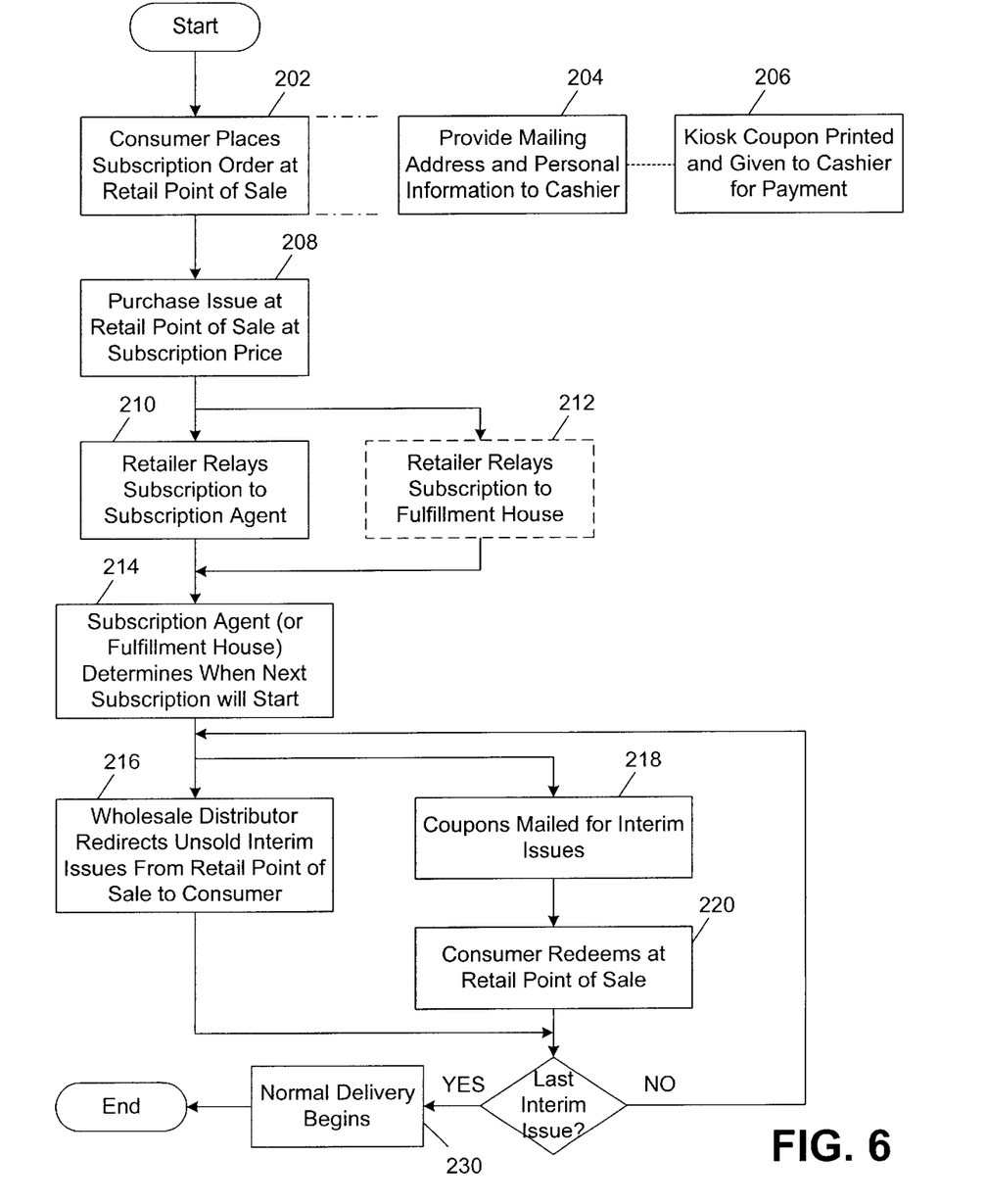
FIG. 6 is a flowchart illustrating principle steps in the initiation of the subscription process through a retail point of sale.

Reference is now made to FIG. 6, which is a flow chart illustrating the initiation of the subscription process through a retail point of sale. The process begins with a consumer 160 (see FIGS. 4 and 5) placing a subscription order at a retail point of sale (step 202). As previously described, this step may be implemented in various ways. One way may be for the consumer 160 to provide various information including an identification of the subscriber, an identification of the periodical sought, the term of the subscription, etc. (step 204). Step 202 may also be implemented by a consumer 160 providing subscription information to a kiosk, which may then print a coupon or other receipt for the consumer to take to a cashier for payment (step 206). Alternatively, the consumer could authorize payment (e.g., via credit card) through the kiosk. The consumer could then merely present the printed receipt to the cashier, without making any additional payment for the periodical obtained at the retail point of sale. Once the consumer has placed the subscription order, he may then separately purchase the current issue of the periodical at the retail point of sale, at the reduced, subscription price (step 208). As described above, and depending upon the particular implementation, the consumer may receive a credit towards the subscription price for any amounts paid to the cashier. Thereafter, the retailer may relay the subscription information provided by the consumer to a subscription agent (step 210). Alternatively, the retailer may relay this information directly to a fulfillment house (step 212).

Once the subscription information has been communicated from the retailer 150 (or the fulfillment house) a determination is made as to when the normal subscription delivery will start (step 214). Thereafter, the wholesale distributor is engaged to redirect unsold interim issues of the periodical from a retail point of sale to the subscriber or consumer premises (step 216). This redirection of step 216 may be implemented in any of a variety of ways. For example, one method may be to print out interim mailing labels to the subscriber address. The wholesale distributor could then simply apply these labels to unsold periodical issues collected from the retailer and deposit them in the mail for delivery to the consumer address. Alternatively, agents of the wholesale distributor could be utilized to make direct delivery to consumer addresses of the interim periodical issues. As an alternative to step 216, coupons may be directly mailed to the consumer premises, which coupons could be redeemable at various retail points of sale for interim issues of the periodical (step 218). Thereafter, the consumer could present the coupons at any of a number of retail points of sale (step 220) in exchange for the identified periodical. The process denoted in step 216, or steps 218 and 220, could be repeated until the normal subscription delivery is scheduled to begin. Thereafter, subscription delivery could be effectuated through conventional delivery methods (step 230).

It should be appreciated that additional methods for initiating the subscription process, in accordance with the spirit and scope of the invention, may be implemented. For example, retailer-specific blow-in cards may be provided in a periodical. A consumer could submit the blow-in card to a cashier at the retail point-of-sale, and submit payment therewith. The payment may be for the entire subscription period, and the consumer may be supplied with coupons redeemable for additional, retail point-of-sale issues, until normal subscription delivery begins.

Figure 7:
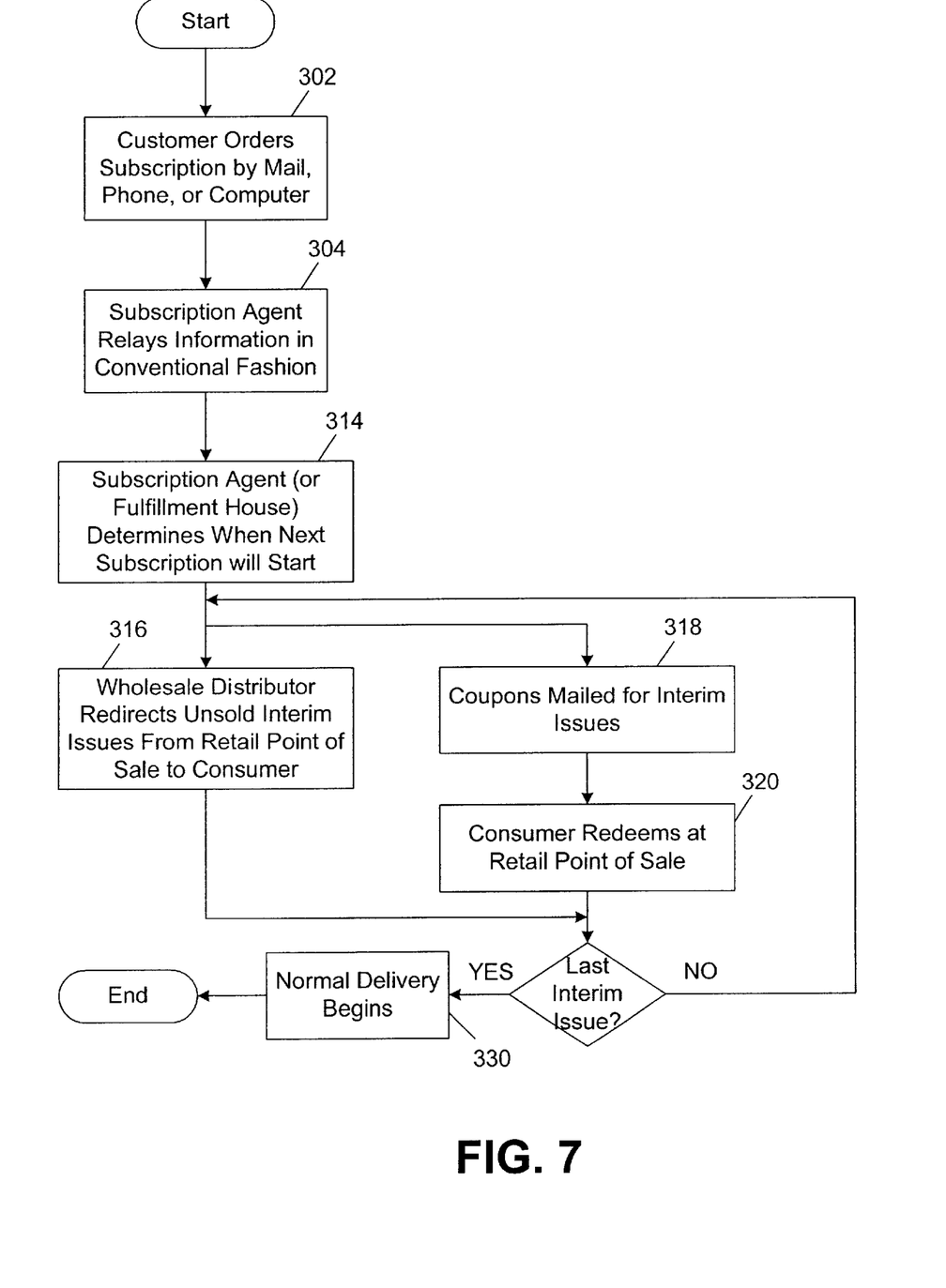
FIG. 7 is a flow chart illustrating steps that may be implemented in a method of distributing a periodical to a subscriber, when the subscription order is placed directly with a subscription agent.

Reference is now made to FIG. 7, which is a flow chart illustrating steps that may be implemented in a method of distributing a periodical to a subscriber, when the subscription order is placed directly with a subscription agent (as opposed to being placed at a retail point of sale). The process starts when a consumer orders a subscription with a subscription agent, either by mail, phone, or web site (step 302). In this regard, it should be understood that orders may be placed over the Internet. Thereafter, the subscription agent relays subscription information to other entities in the subscription distribution environment, in conventional ways (step 304).

Once the subscription information has been communicated a determination is made as to when the normal subscription delivery will start (step 314). Thereafter, the wholesale distributor is engaged to redirect unsold interim issues of the periodical from a retail point of sale to the subscriber or consumer premises (step 316). This redirection of step 316 may be implemented in any of a variety of ways. For example, one method may be to print out interim mailing labels to the subscriber address. The wholesale distributor could then simply apply these labels to unsold periodical issues collected from the retailer and deposit them in the mail for delivery to the consumer address. Alternatively, agents of the wholesale distributor could be utilized to make direct delivery to consumer addresses of the interim periodical issues. As an alternative to step 316, coupons may be directly mailed to the consumer premises, which coupons could be redeemable at various retail points of sale for interim issues of the periodical (step 318). Thereafter, the consumer could present the coupons at any of a number of retail points of sale (step 320) in exchange for the identified periodical. The process denoted in step 316, or steps 318 and 320, could be repeated until the normal subscription delivery is scheduled to begin. Thereafter, subscription delivery could be effectuated through conventional delivery methods (step 330).

It should be appreciated that the redirection of interim periodical issues from a retail point of sale to a consumer premises address need not be redirected from the same retail point of sale from which the purchase was made, but rather may be redirected from any of a number of retail points of sale. Further, the retail point of sale, from which periodicals are redirected, may change from issue to issue, depending upon the availability of unsold, or otherwise available, issues from the retail point of sale.

In this regard, the embodiment or embodiments discussed herein were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method for fulfilling a periodical subscription to a consumer comprising the steps of:

placing a subscription with a subscription agent for a periodical to be delivered to the consumer at a consumer premise;

communicating the subscription information from the subscription agent to a fulfillment house;

obtaining information as to when regular delivery of the periodical to the consumer premises is to begin; and redirecting interim issues of the periodical from a retail point of sale to the consumer after paying for the subscription.

2. The method as defined in claim 1, wherein the interim issues of the periodical are distributed to the consumer at a subscription price.

3. The method as defined in claim 1, wherein the step of placing a subscription includes the steps of filling out a subscription card and directing the subscription card to the subscription agent.

4. The method as defined in claim 3, wherein the step of directing the subscription card to the subscription agent included directing the subscription card through a cashier and on to the subscription agent.

5. The method as defined in claim 1, wherein the step of placing a subscription includes the step of directing an order request to a subscription agent.

6. The method as defined in claim 5, wherein the step of directing the order request to the subscription agent includes the steps of filling out information and submitting the information to the subscription agent over a computer network.

7. The method as defined in claim 5, wherein the step of directing the order request to the subscription agent includes the step of providing information to the subscription agent over a telephone.

8. The method as defined in claim 1, wherein the step of redirecting the copy of the periodical includes the step of directing a copy of the periodical from a wholesale distributor to a subscription agent for delivery to the consumer premise.

9. The method as defined in claim 1, wherein the step of redirecting the copy of the periodical includes the mailing at least one coupon to the consumer, wherein the at least one coupon allows the consumer to pickup the periodical at a retail point of sale.

10. The method as defined in claim 1, wherein the step of mailing at least one coupon to the consumer more specifically includes mailing the at least one coupon from a subscription agent.

11. A method for fulfilling a periodical subscription to a consumer, the improvement comprising the step of redirecting at least one copy of the periodical from a retail point of sale to a consumer premise after paying for the subscription, wherein the step of redirecting the copy of the periodical includes performing a step selected from the group consisting of: directing a copy of the periodical from a wholesale distributor to a subscription agent for delivery to the consumer premise, mailing at least one coupon to the consumer, wherein the at least one coupon allows the consumer to pickup the periodical at a retail point of sale, and mailing at least one coupon from a subscription agent to the consumer.

12. The method as defined in claim 11, wherein the step of redirecting the copy of the periodical more specifically includes redirecting a copy of the periodical after the consumer places a subscription order, but before a subscription issues of the periodical begin being mailed from a printer to the consumer.

13. A method for initiating a periodical subscription for a consumer comprising the steps of:

providing subscription information at a first retail point of sale;

paying for the subscription at the first retail point of sale;

obtaining information as to when regular delivery of the periodical to the consumer premises is to begin;

communicating the subscription information to a fulfillment house; and redirecting at least one tissue of the periodical from a second retail point of sale to the consumer after paying for the subscription.

14. The method as defined in claim 13, wherein the step of providing subscription information at the retail point of sale includes providing information to a cashier.

15. The method as defined in claim 13, wherein the first retail point of sale and the second retail point of sale are the same location.

16. The method as defined in claim 13, wherein the first retail point of sale and the second retail point of sale are different locations.

17. The method as defined in claim 13, wherein the step of providing subscription information at the first retail point of sale includes the steps of providing information to a kiosk.

18. The method as defined in claim 17, further including the step of receiving a coupon from the kiosk and presenting the coupon to a cashier for payment.

19. The method as defined in claim 17, wherein the step of paying for the subscription includes, the step of authorizing payment through the kiosk.

20. The method as defined in claim 13, wherein the step of paying for the subscription includes paying cash to a cashier.

21. The method as defined in claim 13, wherein the step of paying for the subscription includes the step of paying a discounted, subscription rate for a copy of the periodical purchased at the first retail point of sale.

22. The method as defined in claim 13, wherein the step of redirecting at least one subsequent issue of the periodical further includes redirecting all interim issues of the periodical between a current issue when the subscription information is provided at the first retail point of sale and when regular delivery of the periodical to the consumer premises is to begin.

23. The method as defined in claim 13, wherein the step of communicating the subscription information to a fulfillment house includes communicating the subscription information through a subscription agent.

24. The method as defined in claim 13, wherein the step of redirecting the copy of the periodical includes the step of directing a copy of the periodical from a wholesale distributor to a subscription agent for delivery to the consumer premise.

25. The method as defined in claim 13, wherein the step of redirecting the copy of the periodical includes mailing at least one coupon from a subscription agent to the consumer, wherein the at least one coupon allows the consumer to pick up the periodical at a retail point of sale.

* * * * *